(12) United States Patent
Kishinami

(10) Patent No.: US 9,353,504 B2
(45) Date of Patent: May 31, 2016

(54) REVOLVING APPARATUS FOR WORK VEHICLE

(71) Applicant: KOMATSU LTD., Tokyo (JP)

(72) Inventor: Yousuke Kishinami, Hirakata (JP)

(73) Assignee: KOMATSU LTD., Tokyo (JP)

( * ) Notice: Subject to any disclaimer, the term of this patent is extended or adjusted under 35 U.S.C. 154(b) by 410 days.

(21) Appl. No.: 14/115,655

(22) PCT Filed: Jun. 25, 2013

(86) PCT No.: PCT/JP2013/067402
§ 371 (c)(1),
(2) Date: Nov. 5, 2013

(87) PCT Pub. No.: WO2014/087691
PCT Pub. Date: Jun. 12, 2014

(65) Prior Publication Data
US 2014/0190776 A1    Jul. 10, 2014

(30) Foreign Application Priority Data

Dec. 7, 2012 (JP) ................................. 2012-268436

(51) Int. Cl.
*B62D 33/00*  (2006.01)
*E02F 9/12*   (2006.01)
(Continued)

(52) U.S. Cl.
CPC ................ *E02F 9/128* (2013.01); *B60T 1/062* (2013.01); *E02F 9/0833* (2013.01); *E02F 9/2275* (2013.01); *F16D 55/24* (2013.01); *F16D 2055/0058* (2013.01); *F16D 2121/06* (2013.01)

(58) Field of Classification Search
USPC ......... 180/89.13; 188/72.1, 72.5; 37/433, 443
See application file for complete search history.

(56) References Cited

U.S. PATENT DOCUMENTS 5,725,446 A * 3/1998 Kaku .................. F16H 61/6625
                                                              474/11
7,481,289 B2 * 1/2009 Ueda .................. B62D 33/0625
                                                              180/89.12
(Continued)

FOREIGN PATENT DOCUMENTS

JP         52-26701 A    2/1977
JP         62-7465 U     1/1987
(Continued)

OTHER PUBLICATIONS

International Search Report for PCT/JP2013/067402, issued on Jun. 25, 2013.

*Primary Examiner* — Toan To
(74) *Attorney, Agent, or Firm* — Global IP Counselors, LLP

(57) ABSTRACT

A revolving apparatus for a work vehicle includes a drive unit, a brake unit under the drive unit, a deceleration unit under the brake unit, and an output unit under the deceleration unit. The brake unit has a brake main body that stops revolution, a housing, a piston and a spring. The housing has a first face with a first concave component. The piston has a second face opposite the first face with a second concave component. The piston is disposed between the brake main body and the housing, and is movable with respect to the housing in order to actuate the brake main body. The spring member has two ends held in the first and second concave components. The first and second concave components have cylindrical shapes. The inside diameter of the first concave component is greater than the inside diameter of the second concave component.

3 Claims, 11 Drawing Sheets

(51) Int. Cl.
  *E02F 9/08* (2006.01)
  *E02F 9/22* (2006.01)
  *B60T 1/06* (2006.01)
  *F16D 55/24* (2006.01)
  *F16D 55/00* (2006.01)
  *F16D 121/06* (2012.01)

(56) References Cited

U.S. PATENT DOCUMENTS

| 2005/0011684 | A1* | 1/2005 | Uemura | A01D 69/00 180/6.24 |
| 2008/0029354 | A1* | 2/2008 | Yoshimatsu | E02F 9/128 188/72.1 |
| 2008/0053719 | A1* | 3/2008 | Yoshino | B60K 7/0007 180/55 |
| 2009/0029826 | A1* | 1/2009 | Eguchi | B60T 7/02 477/39 |
| 2009/0156345 | A1* | 6/2009 | Ishimori | F16H 47/04 475/116 |
| 2010/0290883 | A1* | 11/2010 | Kitatani | E02F 9/18 414/719 |
| 2015/0075893 | A1* | 3/2015 | Sakai | F01N 13/1805 180/309 |
| 2015/0275937 | A1* | 10/2015 | Yotsuzuka | E02F 9/2278 60/456 |
| 2015/0345112 | A1* | 12/2015 | Yamada | E02F 9/2221 414/722 |
| 2016/0032993 | A1* | 2/2016 | Takei | B60T 8/171 701/70 |

FOREIGN PATENT DOCUMENTS

| JP | 10-226356 A | 8/1998 |
| JP | 2006-25580 A1 | 1/2006 |
| JP | 2008-232270 A | 10/2008 |

* cited by examiner

REVOLVING APPARATUS FOR WORK VEHICLE

CROSS-REFERENCE TO RELATED APPLICATIONS

This application is a U.S. National stage application of International Application No. PCT/JP2013/067402, filed on Jun. 25, 2013. This U.S. National stage application claims priority under 35 U.S.C. §119(a) to Japanese Patent Application No. 2012-268436, filed in Japan on Dec. 7, 2012, the entire contents of which are hereby incorporated herein by reference.

BACKGROUND

1. Field of the Invention

The present invention relates to a revolving apparatus for a work vehicle.

2. Background Information

An upper revolving unit having a work implement or the like, and a lower traveling unit having crawlers are provided to a work vehicle such as a hydraulic excavator. In the case of a hydraulic excavator, for example, the work implement is constituted by a boom, an arm, a bucket, or the like.

A revolving apparatus comprising a swing motor, swing machinery, and an output pinion is provided in order to make the upper revolving unit revolve with respect to the lower traveling unit. Meanwhile, a swing circle is provided to the lower traveling unit. The swing machinery is equipped with a brake unit, a deceleration unit for decelerating the rotational drive force from the swing motor, or the like and the output pinion disposed on the lower side of the swing machinery meshes with teeth provided on the inside or outside of the swing circle. The rotational drive force of the swing motor is transmitted to the output pinion, and the swing machinery rotates on the inside or outside of the swing circle, the result being that the upper revolving unit revolves with respect to the lower traveling unit.

Here, a brake unit that halts the revolution is provided in the interior of the swing machinery. A brake unit such as this is disclosed in Japanese Laid-Open Patent Application 2008-232270, for example. FIG. 11 shows the internal structure around the brake unit of the swing machinery disclosed in Japanese Laid-Open Patent Application 2008-232270. In Japanese Laid-Open Patent Application 2008-232270, a mechanical brake 1000 is provided as a brake unit. This mechanical brake 1000 brakes the rotation of a drive shaft 1001. The mechanical brake 1000 is configured so that a brake disk 1002 joined to the drive shaft 1001 can be squeezed and held by a brake piston 1004 whose up and down motion is controlled via brake pads 1003, and this squeezing can be released.

A spring member 1005 provided to the upper part of a brake piston 1004 imparts a downward biasing force to the brake piston 1004. This spring member 1005 is disposed in a concave component 1006a formed in a housing 1006 provided to the upper part of the brake piston 1004. The downward biasing force provided by the spring member 1005 causes the brake piston 1004 to squeeze and hold a brake disk 1002, resulting in a state in which the brake is actuated. Also, the up and down sliding of the brake piston 1004 is controlled by supplying and discharging hydraulic fluid to and from a hydraulic chamber 1007. When hydraulic fluid is supplied to the hydraulic chamber 1007, the brake piston 1004 compresses the spring member 1005 while being pushed upward. This releases the clamped state of the brake disk 1002 by the brake piston 1004, and releases the braking.

SUMMARY

However, the following problems were encountered with the conventional revolving apparatus discussed above.

With a revolving apparatus having a brake unit such as that described above, it is preferable to increase the natural length of the spring member 1005, and thereby increase the stroke of the spring member, in order to prevent buckling of the spring member and to increase the pressing force of the spring member. One way to increase the natural length of the spring member 1005 is to increase the overall height of the revolving apparatus. On the one hand, a revolving apparatus is by nature a relatively tall apparatus, having a configuration in which the drive unit, the brake unit, the deceleration unit, and the output unit are linked in the vertical direction. However, it can be a problem if the height of the revolving apparatus is increased too much, so that it sticks out on the upper revolving unit, such as when there is a walkway for the operator or other people on the upper revolving unit where the apparatus is installed.

In light of the problems encountered with conventional revolving apparatuses, it is an object of the present invention to provide a revolving apparatus having a brake unit whose performance is improved by ensuring a long stroke of the spring member.

The revolving apparatus of a work vehicle pertaining to the first aspect of the invention comprises a drive unit, a brake unit, a deceleration unit, and an output unit. The brake unit is disposed under the drive unit. The deceleration unit is disposed under the brake unit. The output unit is disposed under the deceleration unit. The brake unit comprises a brake main body, a housing, a piston, and a spring member. The brake main body stops revolution. The housing has a first face and a first concave component formed in the first face. The piston has a second face opposite the first face and a second concave component formed in the second face, is disposed between the brake main body and the housing, and is provided movably with respect to the housing in order to actuate the brake main body. The two ends of the spring member are held in the first concave component and the second concave component, and this spring member biases the piston toward the brake main body side so as to actuate the brake main body. The first concave component and the second concave component have a cylindrical shape, and the inside diameter of the first concave component is greater than the inside diameter of the second concave component.

Here, the first concave component is formed in the housing, and the second concave component is formed in the piston. The two ends of the spring member are held in the first concave component and the second concave component. This spring member biases the piston and actuates the brake main body, resulting in a state in which revolution is stopped.

When concave components are thus provided to both the housing and the piston, as compared to a conventional configuration in which a concave component is provided only to the piston, it is possible to increase the natural length of the spring member without increasing the height of the revolving apparatus, and the stroke can be lengthened. Accordingly, this prevents buckling of the spring member and increases the pressing force of the piston.

Furthermore, since there is no need to increase the height of the revolving apparatus itself, there is also no need to change the height of the walkway that partially overlaps the revolving apparatus in plan view, or the routing of pipes, so the stroke of the spring member can be lengthened easily.

Also, the inside diameter of the first concave component formed in the housing is greater than the inside diameter of the second concave component formed in the piston here.

In the manufacture of the brake unit, the spring member is placed in the second concave component of the piston, after which the housing is disposed from above the piston so that the spring member will fit into the first concave component. Accordingly, the spring member will fit into the first concave component more easily if the inside diameter of the first concave component is formed greater than the inside diameter of the second concave component, and this makes it easier to dispose the housing from above the piston.

With the revolving apparatus of a work vehicle pertaining to the second aspect of the invention, the brake unit comprises a positioning member. The positioning member is provided from the piston along the housing, and fixes the position of the piston with respect to the housing in a direction perpendicular to the movement direction of the piston.

Here, providing the positioning member fixes the position of the piston with respect to the housing in a direction perpendicular to the movement direction of the piston. Therefore, even if a force is generated that would cause positional offset with the housing in a direction perpendicular to the movement direction of the piston, such as during movement of the piston, this force can be received by the positioning member. This prevents excessive force from being exerted on the spring member.

With the revolving apparatus of a work vehicle pertaining to the third aspect of the invention, the brake unit comprises an hydraulic cylinder. The housing is a ring-shaped member, and a plurality of first concave components are formed around this ring shape. The piston is a ring-shaped member, and a plurality of second concave components are formed around this ring shape. The hydraulic cylinder is disposed on the outside of the piston and moves the piston against the biasing force produced by the spring member. The spring member is provided for each of the first concave component and second concave component that are opposite each other. The brake main body has brake plates and brake disks disposed alternately. In a first state in which the brake main body is actuated, the piston presses on the brake plates and the brake disks, and the brake disks are squeezed by the brake plates, and in a second state in which the brake main body is not actuated, pressing on the brake plates and brake disks by the movement of the piston produced by the hydraulic cylinder is released, and the squeezing of the brake plates on the brake disks is released.

Here, a plurality of concave components are formed in each of the housing, which is a ring-shaped member, and the piston, which is also a ring-shaped member. A spring member is disposed in each of the plurality of sets of first concave component and second concave component. A plurality of sets of brake disk and brake plate are provided, and the plurality of brake disks and brake plates are pressed by the piston, which is biased by the plurality of spring members.

With this configuration comprising a plurality of spring members, brake disks, and brake plates, revolution can be reliably stopped even with a large work vehicle, such as a hydraulic excavator, that requires a relatively large force to stop its revolution.

The present invention provides a revolving apparatus having a brake unit that can ensure a long stroke of the spring members, without increasing the overall height of the apparatus.

DETAILED DESCRIPTION OF EMBODIMENT(S)

The revolving apparatus of a work vehicle pertaining to an embodiment of the present invention will be described through reference to FIGS. 1 to 10.

Figure 1:
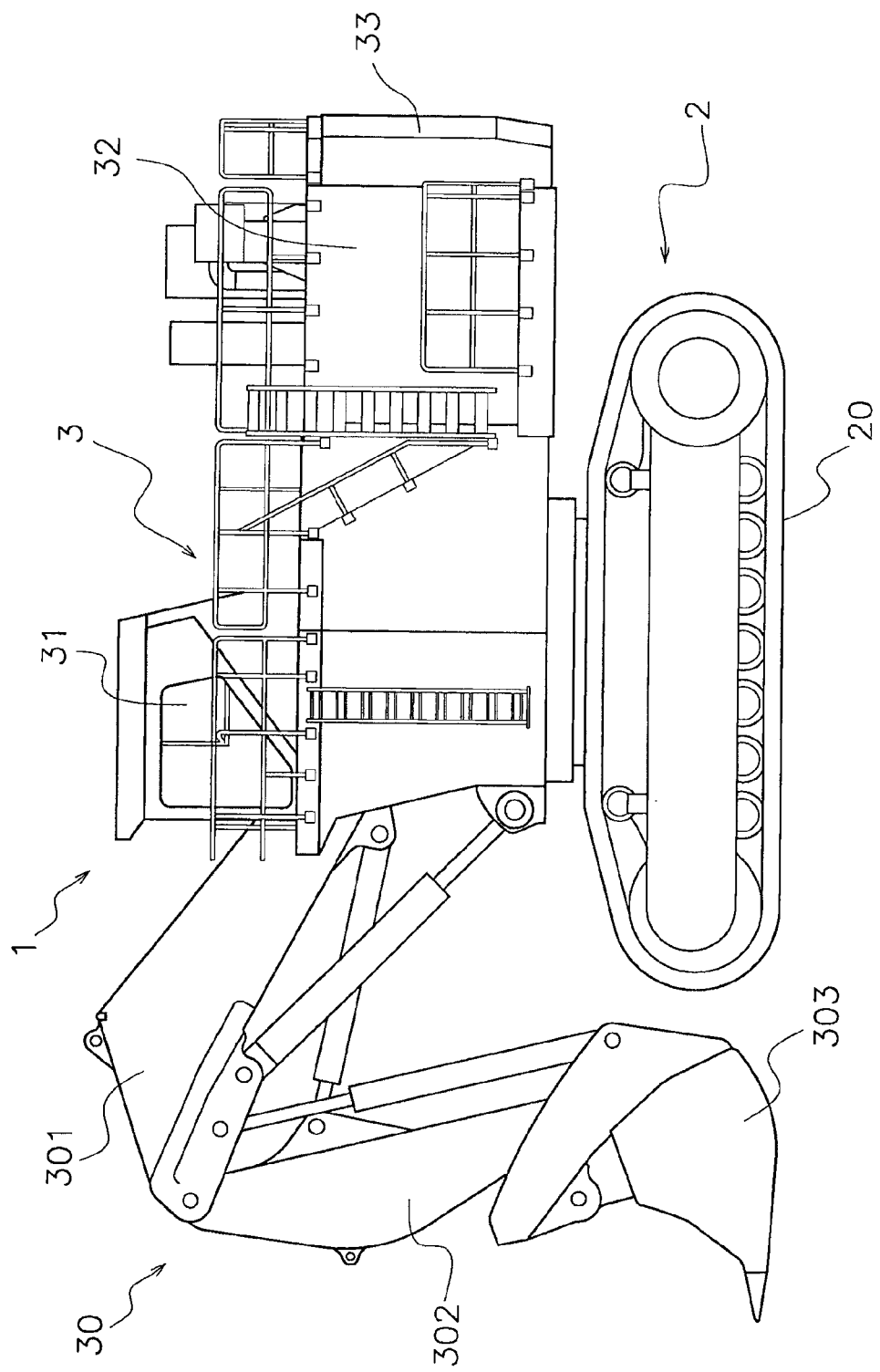
FIG. 1 is a side view of the hydraulic excavator pertaining to an embodiment of the present invention.
Figure 2:
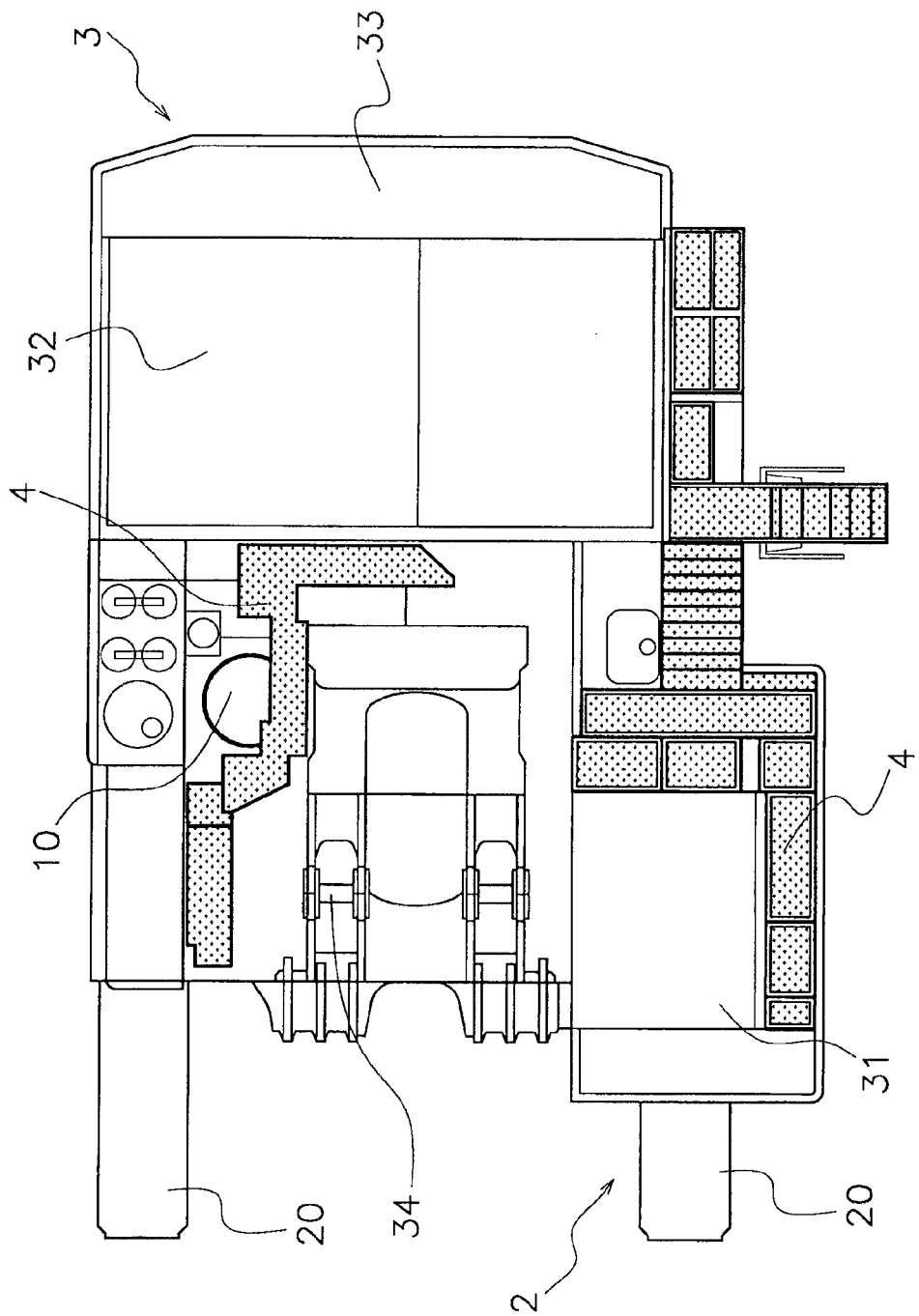
FIG. 2 is a plan view of the hydraulic excavator in FIG. 1.

FIG. 1 is a side view of the hydraulic excavator in this embodiment. FIG. 2 is a partial plan view of the hydraulic excavator in this embodiment, excluding the work implement.

As shown in FIG. 1, a hydraulic excavator 1, which is an example of a work vehicle, comprises a lower traveling unit 2 having crawlers 20 provided on the left and right ends in the travel direction, and an upper revolving unit 3 disposed at the upper part of the lower traveling unit 2. The upper revolving unit 3 is provided with a work implement 30, a driver's compartment 31, an engine compartment 32, a counter weight 33, and so forth. This work implement 30 has a boom 301 that is bent in the middle portion, an arm 302 attached to the distal end of the boom 301, and a bucket 303 attached to the distal end of the arm 302. As shown in FIG. 2, work implement support shafts 34 are provided for attaching the work implement 30.

As shown in FIG. 2, a revolving apparatus 10 is provided to the upper revolving unit 3 in order to make the upper revolving unit 3 revolve with respect to the lower traveling unit 2. A walkway 4 is provided around the upper revolving unit 3. This walkway 4 is installed so that workers can safely access the various parts of the hydraulic excavator 1 to perform maintenance or the like.

Structure of Revolving Apparatus 10

Figure 3:
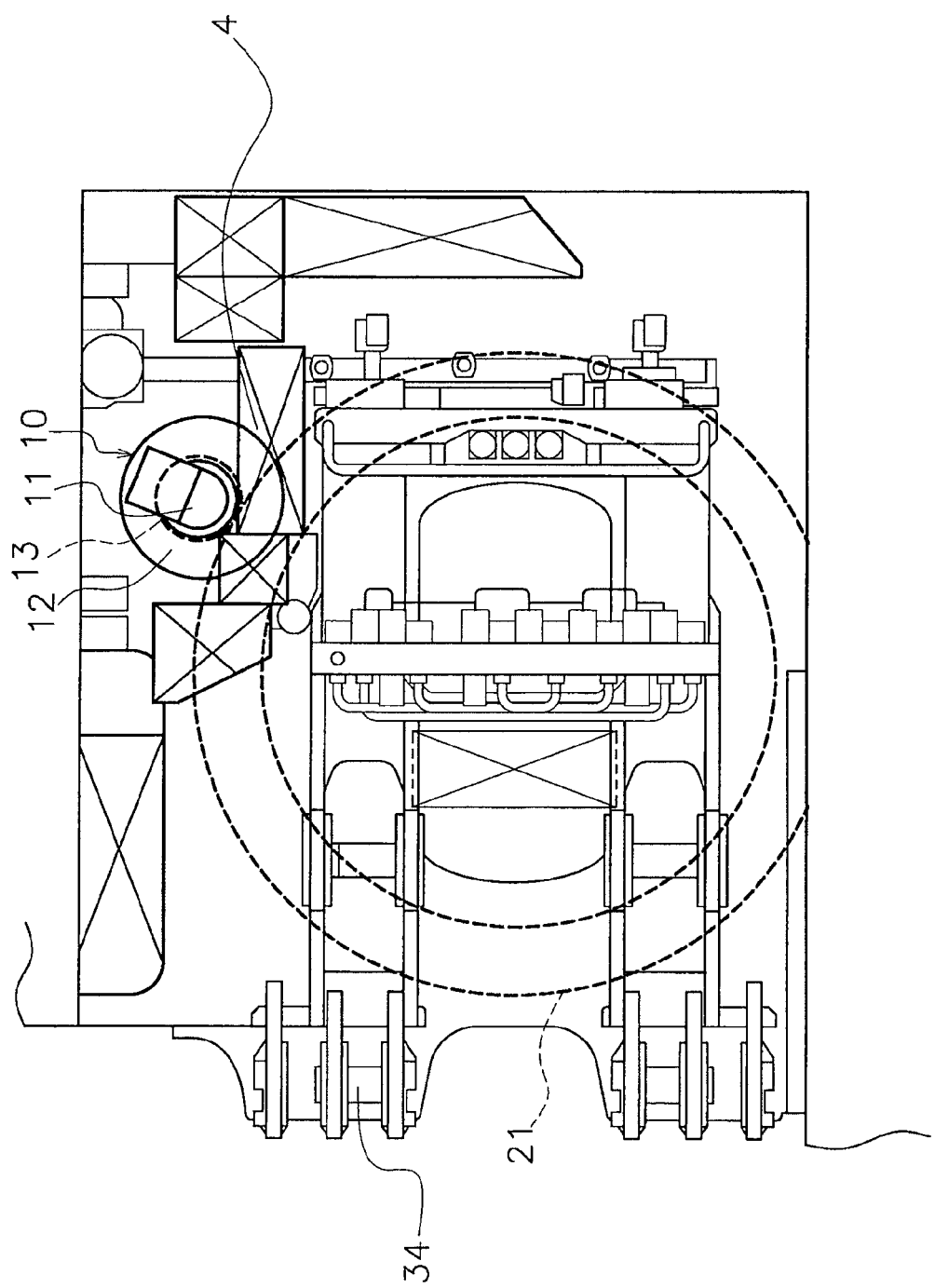
FIG. 3 is a plan view of the main components of the hydraulic excavator in FIG. 2.
Figure 4:
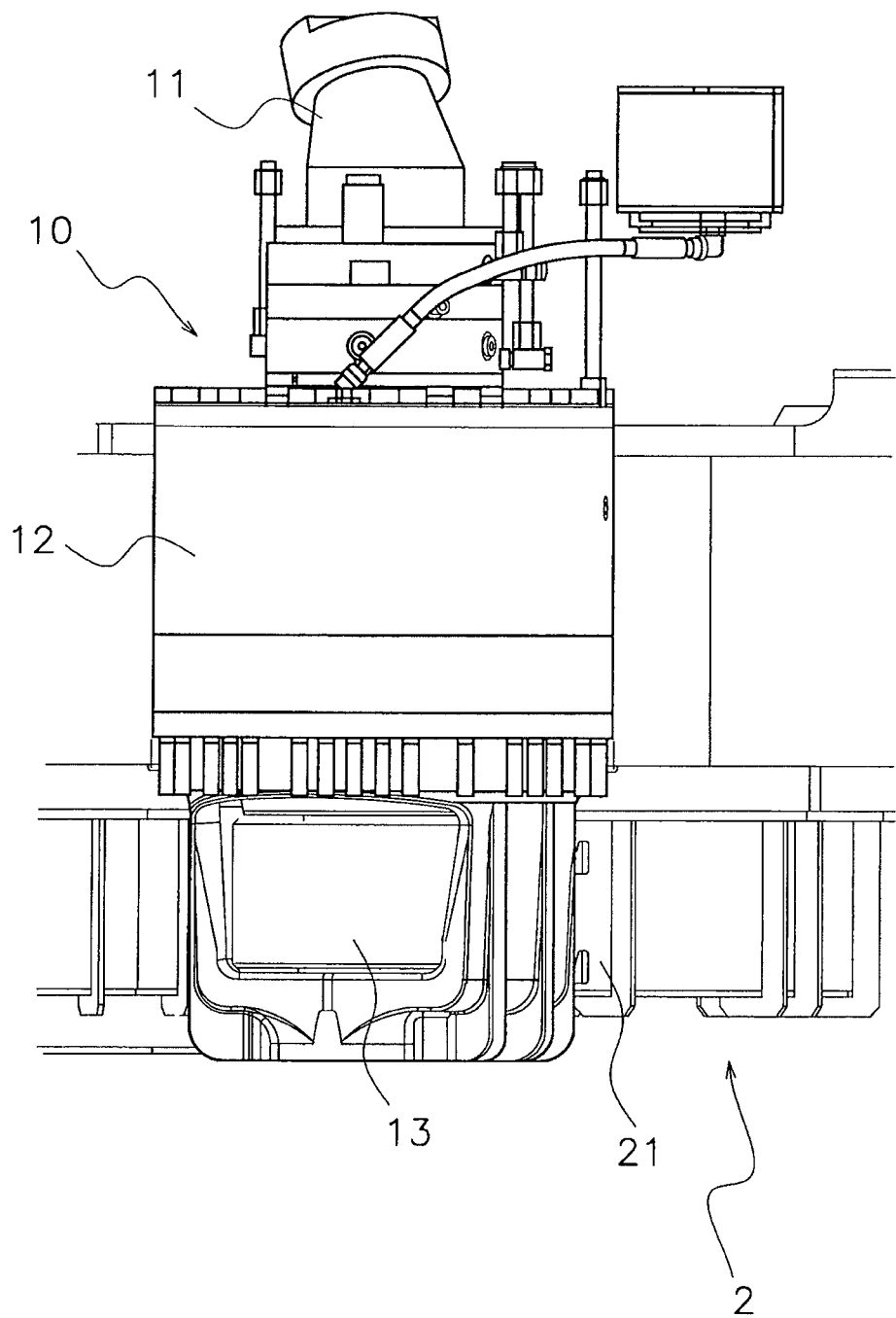
FIG. 4 is a side view of the revolving apparatus for the hydraulic excavator in FIG. 1.

FIG. 3 is a detail plan view of FIG. 2. FIG. 4 is a side view of the revolving apparatus 10 in this Embodiment 1. As shown in FIGS. 3 and 4, the revolving apparatus 10 of the upper revolving unit 3 comprises a drive unit 11 provided on the upper part thereof, a swing machinery 12 provided on the lower side of the drive unit 11, and an output pinion 13 (an example of an output unit) provided on the lower side of the swing machinery 12 in order to output motive force inputted from the drive unit 11. This drive unit 11 has a swing motor (which is a hydraulic motor), a control valve for controlling the hydraulic motor, and so on.

Meanwhile, a swing circle 21 having teeth around its outer periphery is provided to the lower traveling unit 2, and the output pinion 13 meshes with the swing circle 21. The rotation of the swing motor is decelerated by a deceleration unit disposed inside the swing machinery 12, and then transmitted to the output pinion 13, causing the output pinion 13 to rotate. This rotation causes the revolving apparatus 10 to rotate around the outside of the swing circle 21, and the upper revolving unit 3 to which the revolving apparatus 10 is fixed revolves with respect to the lower traveling unit 2.

Figure 5:
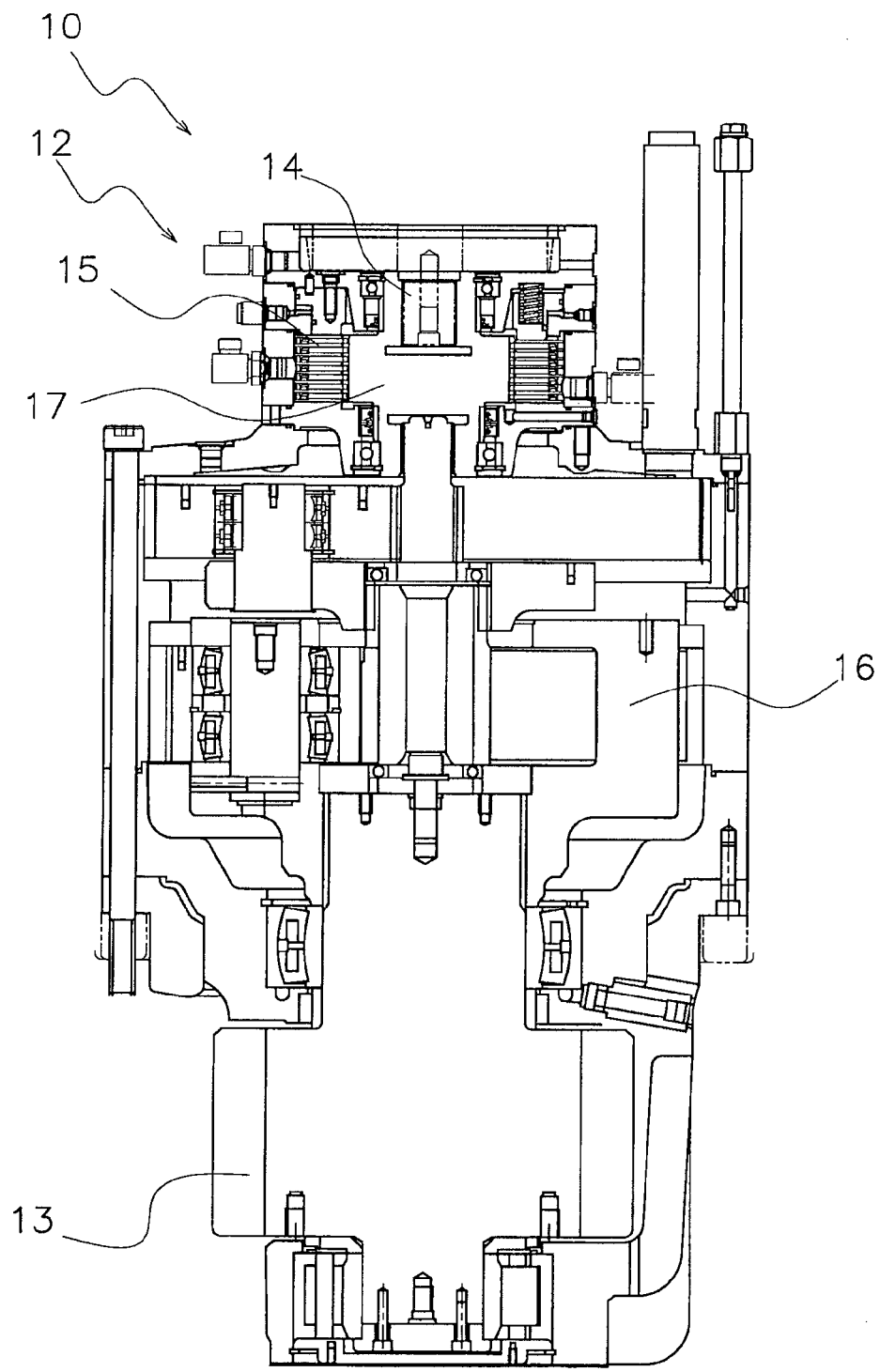
FIG. 5 shows the internal configuration of the swing machinery of the revolving apparatus in FIG. 4.

FIG. 5 is a cross section of the main components of the revolving apparatus 10. More specifically, it is a cross section of the main components of the swing machinery 12 and the output pinion 13.

As shown in FIG. 5, a shaft linking unit 14, a brake unit 15, and a deceleration unit 16 are provided to the swing machinery 12 so as to be continuous from the top toward the bottom.

The shaft linking unit 14 performs mechanical linking of the swing motor disposed in the drive unit 11 to a drive shaft 17 of the swing machinery 12. The brake unit 15 brakes the rotation of the drive shaft 17. The deceleration unit 16 decelerates the rotation of the drive shaft 17 with an internal deceleration mechanism, the product of which is outputted to the output pinion 13.

Thus, in an example of the revolving apparatus 10, the drive unit 11 (including a control valve and a swing motor), the swing machinery 12 (including the shaft linking unit 14, the brake unit 15, and the deceleration unit 16), and the output pinion 13 (an example of an output unit) are continuously disposed in the vertical direction, from the top toward the bottom, so the revolving apparatus 10 has a shape that is taller than it is wide.

Positional Relation between Revolving Apparatus 10 and Walkway 4

Figure 6:
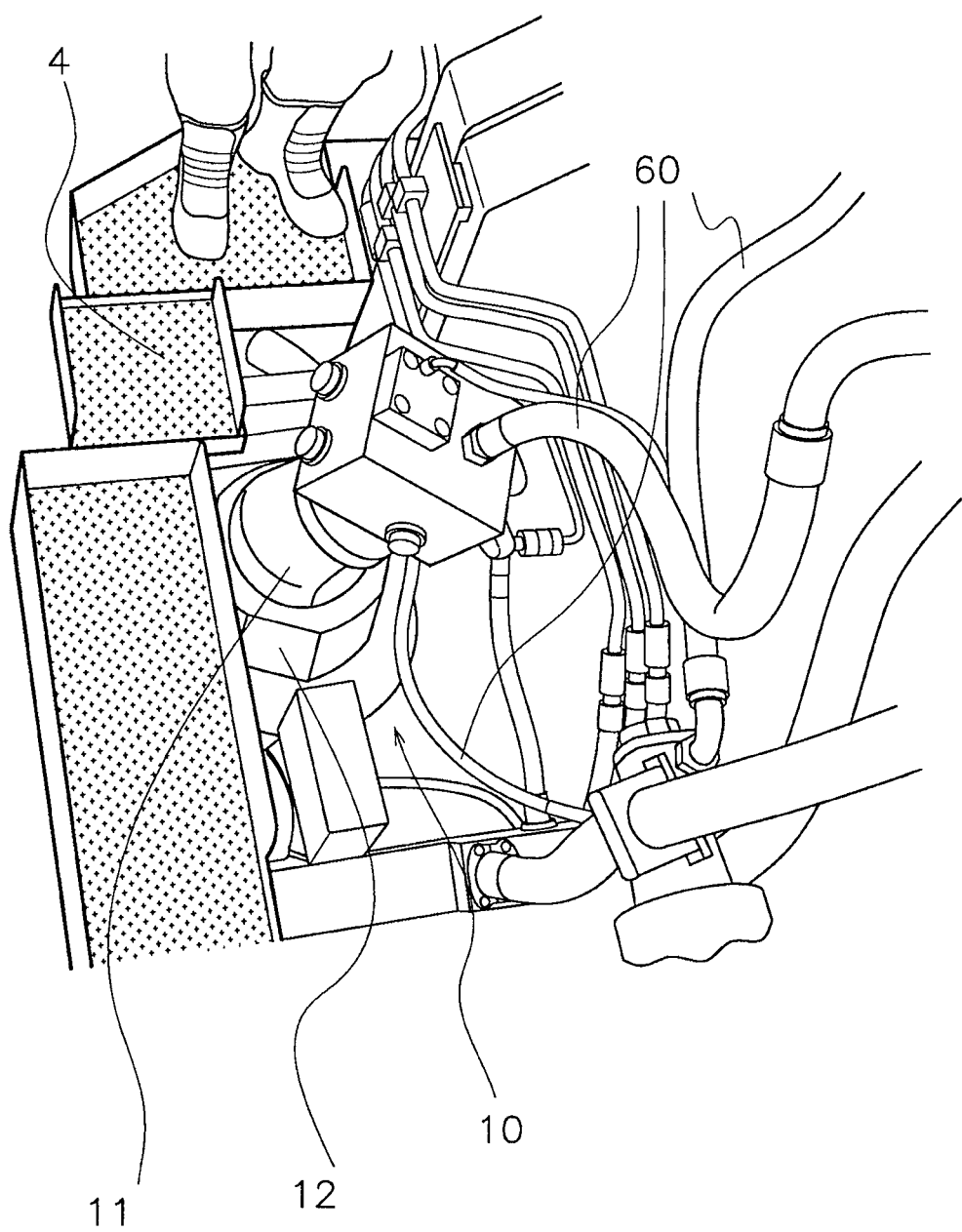
FIG. 6 is an oblique view of the area around the upper part of the revolving apparatus in FIG. 4.

The walkway 4 is provided to the upper revolving unit 3 as illustrated in FIG. 2. FIG. 6 is an oblique view of the area near the top of the revolving apparatus 10 of the hydraulic excavator 1. As shown in FIGS. 3, 5, and 6, this walkway 4 is provided so as to pass through the upper side of the swing machinery 12 in order to perform maintenance on the revolving apparatus 10. Specifically, part of the walkway 4 is provided so as to overlap with the revolving apparatus 10, and more particularly the swing machinery 12, in plan view. More precisely, as shown in FIGS. 3 and 5, the swing machinery 12 is cylindrical in shape, and the drive unit 11 is disposed in the center portion of the upper face of the swing machinery 12. The walkway 4 is at substantially the same height of the drive unit 11, and is disposed so as to pass through the upper side of the swing machinery 12.

A plurality of pipes 60 are provided near the revolving apparatus 10, and these pipes 60 are routed so as not to interfere with the boom 301 during operation of the hydraulic excavator 1.

Brake Unit 15

Figure 7:
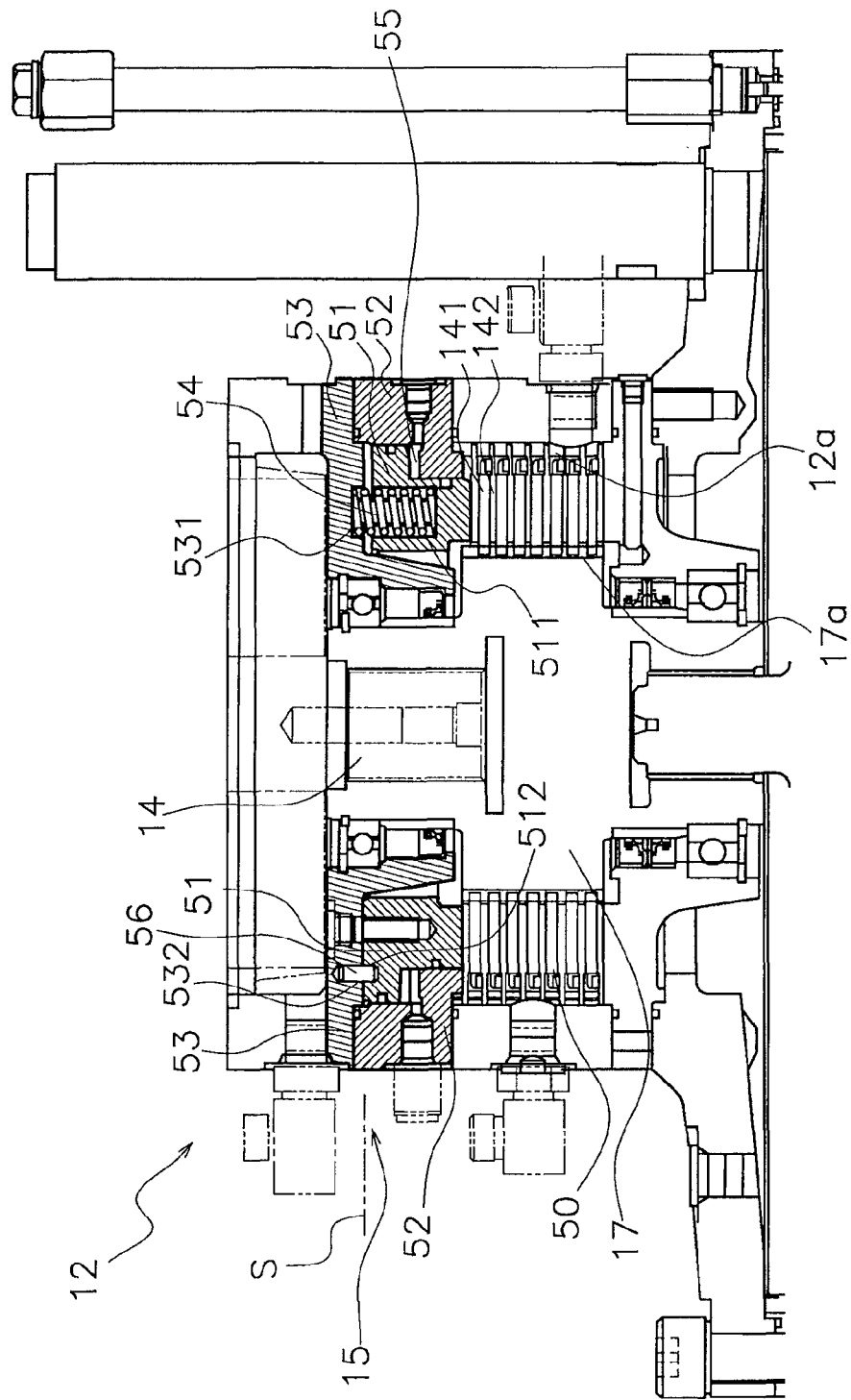
FIG. 7 is a detail view of the internal configuration of the swing machinery in FIG. 5.

Next, the brake unit 15 will be described in detail. FIG. 7 is a detail cross section showing the area near the brake unit 15 of the revolving apparatus 10.

The brake unit 15 comprises a brake main body 50 provided around the periphery of the drive shaft 17, a piston 51 provided at the upper part of the brake main body 50, a hydraulic cylinder 52 that actuates the piston 51, a housing 53 provided on the upper side of the piston 51, and spring members 54 provided between the piston 51 and the housing 53.

The brake main body 50 has brake plates 141 and brake disks 142 disposed in the up and down direction around the drive shaft 17. These brake plates 141 and brake disks 142 are disposed so that the brake disks 142 are squeezed by the brake plates 141 provided above and below them.

The inside of the brake plates 141 is formed in the shape of gear teeth, which mesh with the gear teeth formed on the outer wall 17a of the drive shaft 17. The outside of the brake disks 142 is also formed in the shape of gear teeth, which mesh with the gear teeth formed on the inner wall 12a of the swing machinery 12.

Figure 8:
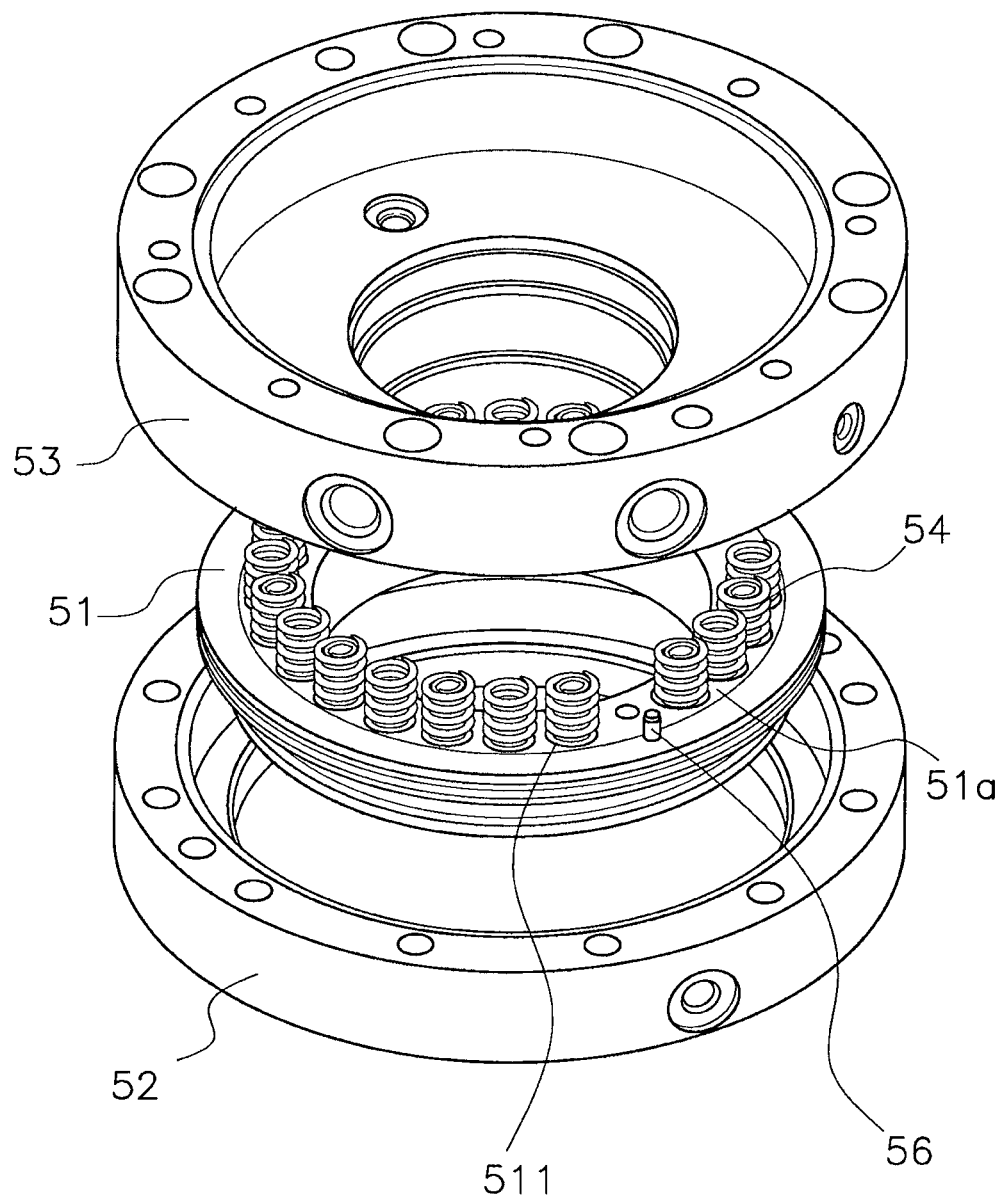
FIG. 8 is an exploded oblique view of the hydraulic cylinder, piston, and housing of the swing machinery in FIG. 5 as seen from above.
Figure 9:
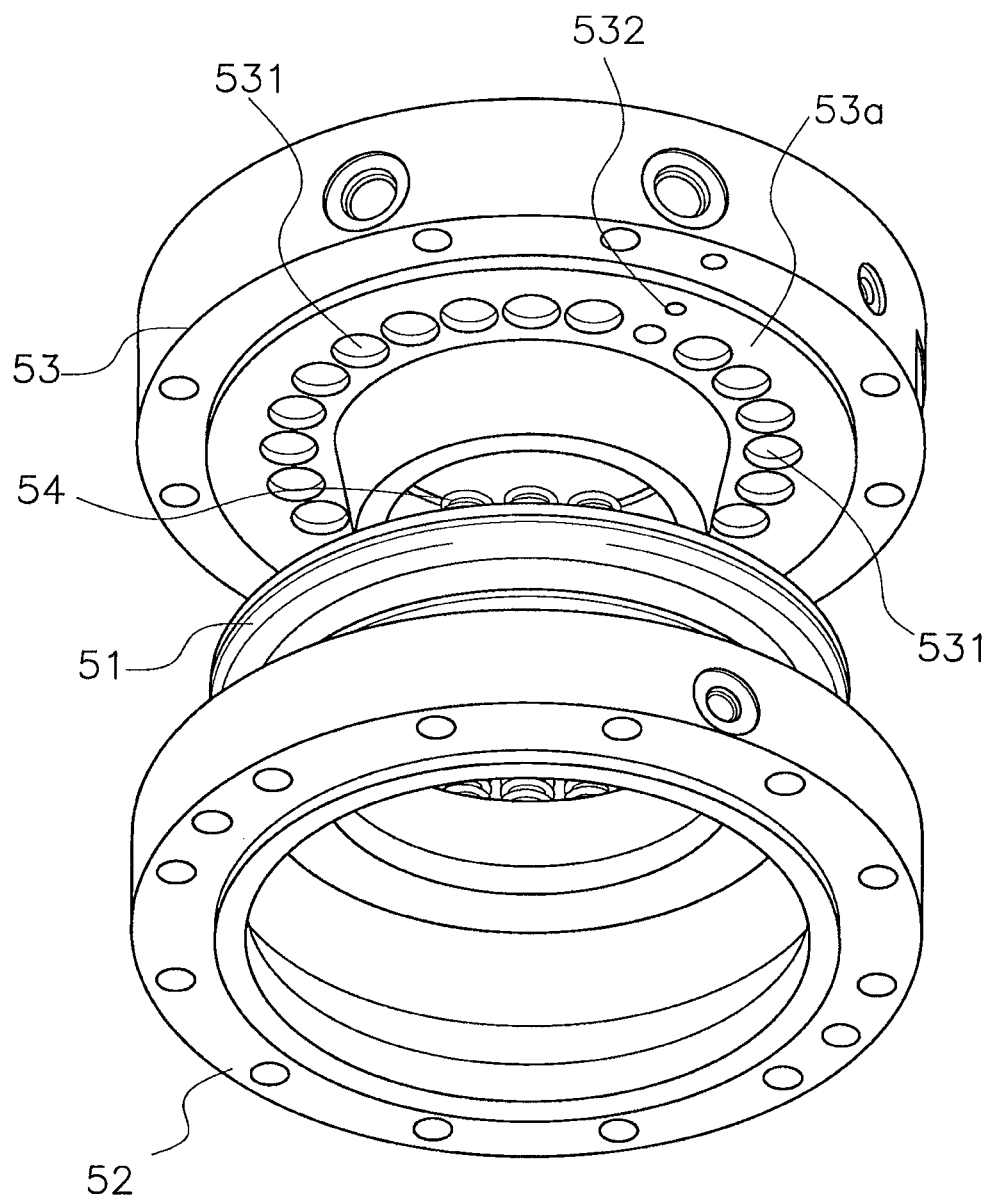
FIG. 9 is an exploded oblique view of the hydraulic cylinder, piston, and housing of the swing machinery in FIG. 5 as seen from below.
Figure 10:
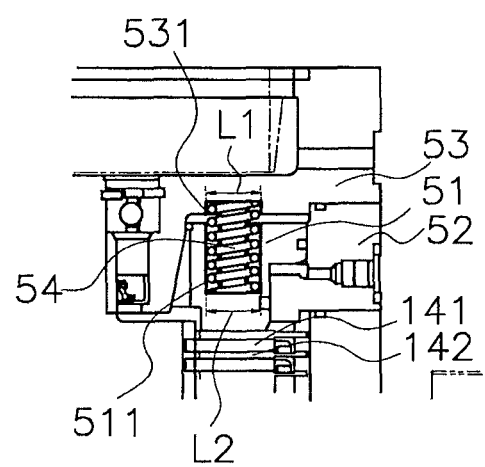
FIG. 10 is a detail view of the configuration near the spring members of the swing machinery in FIG. 5.
Figure 11:
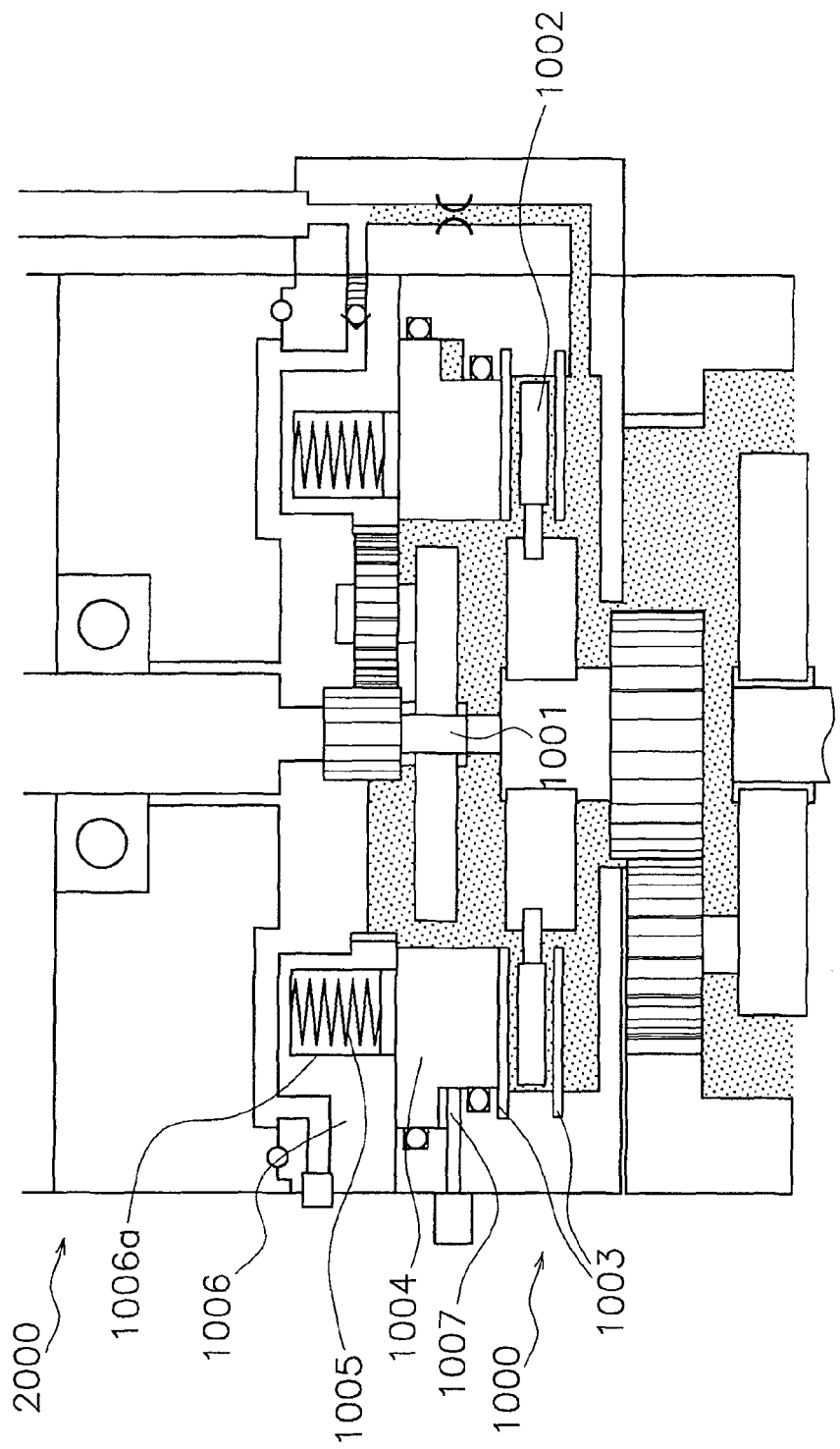
FIG. 11 is a detail view of the internal configuration of the brake unit in conventional swing machinery.

FIG. 8 is an exploded oblique view of the piston 51, the hydraulic cylinder 52, and the housing 53 as seen from above. FIG. 9 is an exploded oblique view of the piston 51, the hydraulic cylinder 52, and the housing 53 as seen from below;

As shown in FIGS. 8 and 9, the piston 51, the hydraulic cylinder 52, and the housing 53 are ring-shaped members. The piston 51 is disposed on the inside of the hydraulic cylinder 52. The housing 53 is disposed above the piston 51 and the hydraulic cylinder 52.

As shown in FIGS. 7 to 9, a plurality of concave components 511 (an example of a second concave component) are formed in the face 51a of the piston 51 (an example of a second face), following the ring shape thereof. A plurality of concave components 531 (an example of a first concave component) are formed in the face 53a (an example of a first face) of the housing 53 that is opposite the face 51a of the piston 51, following the ring shape thereof. These concave components 531 are provided so as to be opposite the concave components 511. The concave components 531 and concave components 511 are both formed in a cylindrical shape, and the inside diameter L1 of the concave components 531 is slightly larger than the inside diameter L2 of the concave components 511, as shown in the detail view of the area near the spring members in FIG. 10.

Thus, a plurality of sets of the mutually opposing concave components 511 and concave components 531 are provided, and the spring members 54 are disposed in these sets so that their ends are held in the concave components 511 and the concave components 531. The spring members 54 are compression springs, and are coil springs formed by winding a wire in a spiral shape.

Here, the housing 53 and the hydraulic cylinder 52 are fixed to the swing machinery 12, and the piston 51 is biased by the spring members 54 toward the brake main body 50 below (this corresponds to an example of the side on which the brake main body is actuated).

As shown in FIG. 7, the hydraulic cylinder 52 controls the movement of the piston 51 in the up and down direction by supplying and discharging hydraulic fluid to and from a hydraulic chamber 55. That is, when hydraulic fluid is supplied to the hydraulic chamber 55, the piston 51 moves upward while compressing the spring members 54 against the resistance of the spring members 54, and when hydraulic fluid is discharged from the hydraulic chamber 55, the piston 51 is biased downward by the spring members 54.

A positioning pin 56 is provided between the housing 53 and the piston 51. This positioning pin is inserted into a concave component 532 formed in the lower face of the housing 53, and a concave component 512 formed in the upper face of the piston 51. Providing the positioning pin 56 prevents misalignment between the housing 53 and the piston 51 in a direction perpendicular to the movement direction of the piston 51 (a direction parallel to the plane S in FIG. 7).

Assembly of Brake Unit 15

In the assembly of the brake unit 15, the hydraulic cylinder 52, the piston 51, and the housing 53 are assembled as a sub-assembly. This will be described through reference to FIGS. 7 to 9. The piston 51 is disposed on the inside of the hydraulic cylinder 52, and then the spring members 54 are disposed so that one end is held in the concave components 511 formed in the piston 51, and the positioning pin 56 is disposed in the concave component 512.

The positioning pin 56 is then mated with the concave component 532, and the housing 53 is placed on the piston 51 and the hydraulic cylinder 52 so that the other ends of the spring members 54 are held in the concave components 531. This completes the sub-assembly. This sub-assembly is fixed to the upper part of the brake main body 50 that has already been attached to the swing machinery 12, completing the assembly of the brake unit 15.

Operation of Brake Unit 15

The operation of the brake unit 15 configured as above will be described. The brake unit 15 in this embodiment is a negative brake, in which the brake is released when hydraulic pressure is applied. That is, the brake is normally in a state in which it is actuated and stopping the revolution, and the brake is released only when revolution is performed.

In a state in which hydraulic fluid has been discharged from the hydraulic chamber 55, the piston 51 is pressed down by the biasing force of the spring members 54. In the resulting state in which the piston 51 has been pressed down, the plurality of brake plates 141 and brake disks 142 are pressed down by the piston 51. Specifically, the brake disks 142 are squeezed and held by the brake plates 141 disposed above and below them. The brake plates 141 here mesh with the drive shaft 17, and the brake disks 142 mesh with the inner wall 12a, so when the brake disks 142 are squeezed and held by the brake plates 141, the drive shaft 17 can no longer rotate, resulting in a state of stopped revolution. This state in which the brake is actuated corresponds to an example of a first state.

Meanwhile, when hydraulic fluid is supplied to the hydraulic chamber 55, the piston 51 moves upward against the biasing force of the spring members 54. The pressing by the piston 51 on the brake plates 141 and the brake disks 142 is then released, and the squeezing and holding of the brake disks 142 by the brake plates 141 is released. This release allows the drive shaft 17 to be rotated by the drive force of the swing motor, and this rotation is decelerated by the deceleration unit 16, after which it is outputted to the output pinion 13, the revolving apparatus 10 rotates around the outside of the swing circle 21, and revolution is performed. This state in which the brake is not actuated corresponds to an example of a second state.

The piston 51 moves in the up and down direction with respect to the housing 53, but the length of the positioning pin 56 is set so that even when the piston 51 has moved as far downward as it can, the pin does not come out of the concave component 532 of the housing 53.

Features (1)

The revolving apparatus 10 in this embodiment comprises the drive unit 11, the brake unit 15, the deceleration unit 16, and the output pinion 13. The brake unit 15 is provided under the drive unit 11. The deceleration unit 16 is disposed under the brake unit 15. The output unit 13 is disposed under the deceleration unit 16. The brake unit is provided to the swing machinery 12 and comprises the brake main body 50, the housing 53, the piston 51, and the spring members 54. The brake main body 50 stops revolution. The housing 53 has the face 53a (an example of a first face) and the concave components 531 (an example of a first concave component) formed in the face 53a. The piston 51 has the face 51a (an example of a second face) opposite the face 53a and the concave components 511 (an example of a second concave component) formed in the face 51a, is disposed between the brake main body 50 and the housing 53, and is provided movably with respect to the housing 53 in order to actuate the brake main body 50. The two ends of the spring members 54 are held in the concave components 531 and the concave components 511, and these spring members bias the piston 51 toward the brake main body 50 side so as to actuate the brake main body 50.

Here, the concave components 531 are formed in the housing 53, and the concave components 511 are formed in the piston 51. The two ends of the spring members 54 are held in the concave components 531 and the concave components 511. These spring members 54 bias the piston 51 and actuate the brake main body 50, resulting in a state in which revolution is stopped.

Thus providing the concave components 511 and concave components 531 to both of the faces 51a and 53a at which the housing 53 and the piston 51 are opposite each other makes it possible to ensure the natural length of the spring members 54, and to increase the stroke length of the spring members 54, without increasing the height of the swing machinery itself, as compared to a conventional configuration in which concave components were provided only to the face on the brake piston side. Therefore, the pressing force of the piston 51 can be increased and buckling of the spring members 54 can be prevented.

Also, if an attempt is made to increase the height of the revolving apparatus 10 itself in order to lengthen the stroke of the spring members 54, the walkway 4 will overlap the revolving apparatus 10 in plan view, as illustrated in FIG. 6, so it is necessary to change the height of the walkway 4. Also, if the height of the revolving apparatus 10 itself is raised, the routing of the pipes 60 must be changed so that they will not interfere with the boom 301, etc. Thus, it is not an easy matter to raise the height of the revolving apparatus itself.

With this embodiment, however, since there is no need to raise the height of the revolving apparatus 10 itself, there is also no need to change the routing of the pipes around the revolving apparatus 10, or the height of the walkway 4 that partially overlaps the revolving apparatus 10 in plan view, and the stroke of the spring members 54 can be easily lengthened.

(2)

The revolving apparatus 10 in this embodiment is such that the concave components 511 and the concave components 531 of the brake unit 15 are cylindrical, and the inside diameter of the concave components 531 is greater than the inside diameter of the concave components 511.

Here, the inside diameter of the concave components 531 formed in the housing 53 is larger than the inside diameter of the concave components 511 formed in the piston 51.

In the manufacture of the brake unit 15, after the spring members 54 have been placed in the concave components 511 of the piston 51, the housing 53 is disposed from above the piston 51 so that the spring members 54 fit into the concave components 531. Therefore, if the inside diameter of the concave components 531 is larger than the inside diameter of the concave components 511, it will be easier to mate the concave components 531 with the spring members 54, and easier to dispose the housing 53 from above the piston 51.

(3)

With the revolving apparatus 10 in this embodiment, the brake unit 15 is equipped with the positioning pin 56. The positioning pin 56 is provided from the piston 51 along the housing 53, and fixes the position of the piston 51 with respect to the housing 53 in a direction perpendicular to the movement direction of the piston 51 (a direction parallel to the plane S in FIG. 7).

Here, the positioning pin 56 is provided to fix the position of the piston 51 with respect to the housing 53 in a planar direction perpendicular to the movement direction of the piston 51. Therefore, when the piston 51 is moving, etc., even if a force is generated that would create misalignment of the housing 53 with respect to the piston 51 in a planar direction perpendicular to this movement direction, since that force is received by the positioning pin 56, an excessive force is prevented from being exerted on the spring members 54 in the horizontal direction.

(4)

The revolving apparatus 10 in this embodiment further comprises the hydraulic cylinder 52 in the brake unit 15. The housing 53 is a ring-shaped member, and a plurality of the concave components 531 are formed around the ring shape thereof. The piston 51 is a ring-shaped member, and a plurality of concave components 511 are formed around the ring shape thereof. The hydraulic cylinder 52 is disposed on the outside of the piston 51, and moves the piston 51 against the biasing force produced by the spring members 54. The spring members 54 are provided one each to the opposing concave components 511 and concave components 531. The brake main body 50 has the brake plates 141 and the brake disks 142 that are disposed alternately. In a first state in which the brake main body 50 is actuated, the piston 51 presses on the brake plates 141 and the brake disks 142 so that the brake disks 142 are squeezed by the brake plates 141, and in a second state in which the brake main body 50 is not actuated, the movement of the piston 51 produced by the hydraulic cylinder 52 releases the pressing on the brake plates 141 and the brake disks 142, and the squeezing of the brake disks 142 by the brake plates 141 is released.

Here, a plurality of the concave components 511 and concave components 531 are formed in each of the piston 51 (a ring-shaped member) and the housing 53 (a ring-shaped member). The spring members 54 are disposed in each of the plurality of sets of concave components 511 and concave components 531. A plurality of the brake plates 141 and brake disks 142 are provided, and the brake plates 141 and brake disks 142 are pressed on by the piston 51 that is biased by the plurality of spring members 54.

This a configuration such as this, comprising a plurality of spring members 54, brake plates 141, and brake disks 142, revolution can be reliably stopped even with a large work vehicle such as a hydraulic excavator that requires a relatively large force to stop its revolution.

Other Embodiments

An embodiment of the present invention was described above, but the present invention is not limited to or by the above embodiment, and various modifications are possible without departing from the gist of the invention.

(A)

In the above embodiment, as shown in FIG. 8, the spring members 54 are disposed with no gaps around the circle of the ring-shaped piston 51, except for the part where the positioning pin 56 is disposed, but they may instead be disposed with spaces in between. For instance, the spring members 54 may be disposed at only four positions that are in point symmetry. There is no limit to the number of the spring members 54.

(B)

In the above embodiment, the inside diameter of the concave components 531 formed in the housing 53 was larger than the inside diameter of the concave components 511 formed in the piston 51, but this is not the only option, and both the concave components 511 and the concave components 531 may be of any size, so long as at least the ends of the spring members 54 will fit in. However, it is preferable for the inside diameter of the concave components 531 to be larger than the inside diameter of the concave components 511 because it will be easier to fit the spring members 54 into the concave components 531 when the housing 53 is disposed at the upper part of the piston 51.

(C)

In the above embodiment, teeth were formed around the outside of the swing circle 21, and the revolving apparatus 10 rotated around the outside of the swing circle 21, but the configuration may instead be such that teeth are formed on the inside of the swing circle 21, and the revolving apparatus 10 rotates around the inside of the swing circle 21.

Because the walkway 4 is generally disposed close to the outer periphery of the upper revolving unit 3, if the revolving apparatus 10 is disposed on the outside of the swing circle 21, then the swing circle 21 and the walkway 4 will often partially overlap in plan view. In such a case a benefit is that the height of the walkway 4 is not changed, so the benefit of not raising the height of the revolving apparatus itself will be further manifested. However, even with a configuration in which the revolving apparatus 10 rotates around the inside of the swing circle 21, if concave components are formed in both the housing 53 and the piston 51, the natural length of the spring members can be increased without changing the height of the revolving apparatus 10, so a benefit is that there is no need to change the routing of the pipes around the upper part of the revolving apparatus 10. Also, even with a configuration in which the revolving apparatus 10 rotates on the inside of the swing circle 21, another benefit is that if the walkway 4 passes over the top side of the swing circle 21, there will of course be no need to change the height of the walkway 4.

(D)

In the above embodiment, the revolving apparatus of a hydraulic excavator was described as an example, but the present invention is not limited to this, and can also be applied to any work vehicle having a revolving unit on a chassis, and not just to a hydraulic excavator.

INDUSTRIAL APPLICABILITY

The revolving apparatus for a work vehicle pertaining to the present invention has the effect of allowing good braking performance to be obtained by ensuring a long stroke of the spring members in the brake unit, without having to raise the height of the revolving apparatus, and can therefore be widely applied to revolving apparatuses in a variety of work vehicles such as a hydraulic excavator.

The invention claimed is:

1. A revolving apparatus for a work vehicle, comprising:
a drive unit;
a brake unit disposed under the drive unit;
a deceleration unit disposed under the brake unit; and
an output unit disposed under the deceleration unit,
the brake unit having
   a brake main body that stops revolution,
   a housing having a first face and at least one first concave component formed in the first face,
   a piston having a second face opposite the first face and at least one second concave component formed in the second face, the piston being disposed between the brake main body and the housing, and the piston being movable with respect to the housing in order to actuate the brake main body, and
   at least one spring member having two ends held in the first concave component and the second concave component, the spring member biasing the piston toward a brake main body side so as to actuate the brake main body,
   the first concave component and the second concave component having cylindrical shapes, and
   an inside diameter of the first concave component is greater than an inside diameter of the second concave component.

2. The revolving apparatus for a work vehicle according to claim 1, wherein
the brake unit has a positioning member provided from the piston along the housing that fixes a position of the piston with respect to the housing in a direction perpendicular to a movement direction of the piston.

3. The revolving apparatus for a work vehicle according to claim 1, wherein
the housing is ring-shaped and the at least one first concave component includes a plurality of first concave components that are disposed around the ring shaped housing,
the piston is ring-shaped and the at least one second concave component includes a plurality of second concave components that are disposed around the ring shaped piston,
the brake unit is disposed on an outside of the piston and the brake unit further has a hydraulic cylinder that moves the piston against a biasing force produced by the spring member,
the at least one spring member includes a plurality of spring member, with one of the spring members provided for each of the first concave component and second concave component that are opposite each other,
the brake main body has a plurality of brake plates and brake disks disposed alternately,
in a first state in which the brake main body is actuated,
   the piston presses on the brake plates and the brake disks, and
   the brake disks are squeezed by the brake plates, and
in a second state in which the brake main body is not actuated,
   pressing on the brake plates and brake disks by the movement of the piston produced by the hydraulic cylinder is released, and
   squeezing of the brake plates on the brake disks is released.

* * * * *